(12) United States Patent
Yamada (10) Patent No.: US 9,100,608 B2
(45) Date of Patent: Aug. 4, 2015

(54) TILT ANGLE CORRECTION FUNCTION ON AN IMAGE FORMING APPARATUS

(71) Applicant: FUJI XEROX CO., LTD., Tokyo (JP)

(72) Inventor: Kenji Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/202,556

(22) Filed: Mar. 10, 2014

(65) Prior Publication Data

US 2015/0009520 A1 Jan. 8, 2015

(30) Foreign Application Priority Data

Jul. 8, 2013 (JP) .................................. 2013-142820

(51) Int. Cl.
*H04N 1/387* (2006.01)

(52) U.S. Cl.
CPC ...................................... *H04N 1/387* (2013.01)

(58) Field of Classification Search
None
See application file for complete search history.

(56) References Cited

U.S. PATENT DOCUMENTS

| | | | |
|---|---|---|---|
| 2005/0281483 A1* | 12/2005 | Teng | 382/289 |
| 2006/0221358 A1* | 10/2006 | Takahashi | 358/1.1 |
| 2008/0056598 A1* | 3/2008 | Murakata | 382/254 |
| 2012/0105578 A1* | 5/2012 | Ohmiya et al. | 348/36 |

FOREIGN PATENT DOCUMENTS

JP    A-2004-254166    9/2004

* cited by examiner

*Primary Examiner* — Eric A Rust
(74) *Attorney, Agent, or Firm* — Oliff PLC (57) ABSTRACT

Provided is a tilt angle correction apparatus including a deriving unit that based on pixel values of plural pixels corresponding to a predetermined side of an original document of image information obtained by reading the original document, derives a tilt angle of the side relative to a predetermined reference and derives a degree of reliability of the derived tilt angle, and a correction unit that corrects a direction of an image shown by the image information, based on the derived tilt angle when the degree of reliability is over a predetermined threshold.

12 Claims, 9 Drawing Sheets

TILT ANGLE CORRECTION FUNCTION ON AN IMAGE FORMING APPARATUS

CROSS-REFERENCE TO RELATED APPLICATIONS

This application is based on and claims priority under 35 USC 119 from Japanese Patent Application No. 2013-142820 filed Jul. 8, 2013.

BACKGROUND

Technical Field

The present invention relates to a tilt angle correction apparatus, an image reader, an image forming apparatus, and a non-transitory computer readable medium storing a program.

SUMMARY

According to an aspect of the invention, there is provided a tilt angle correction apparatus including:

a deriving unit that based on pixel values of plural pixels corresponding to a predetermined side of an original document of image information obtained by reading the original document, derives a tilt angle of the side relative to a predetermined reference and derives a degree of reliability of the derived tilt angle; and a correction unit that corrects a direction of an image shown by the image information, based on the derived tilt angle when the degree of reliability is over a predetermined threshold.

BRIEF DESCRIPTION OF THE DRAWINGS

Exemplary embodiments of the present invention will be described in detail based on the following figures, wherein.

DETAILED DESCRIPTION

Hereinafter, an example of an exemplary embodiment for performing the present invention will be described in detail with reference to the drawings. Further, in the following description, an aspect in which a tilt angle correction apparatus according to the present exemplary embodiment is adapted to an image forming apparatus having an image reader will be described as an example.

(First Exemplary Embodiment)

Figure 1:
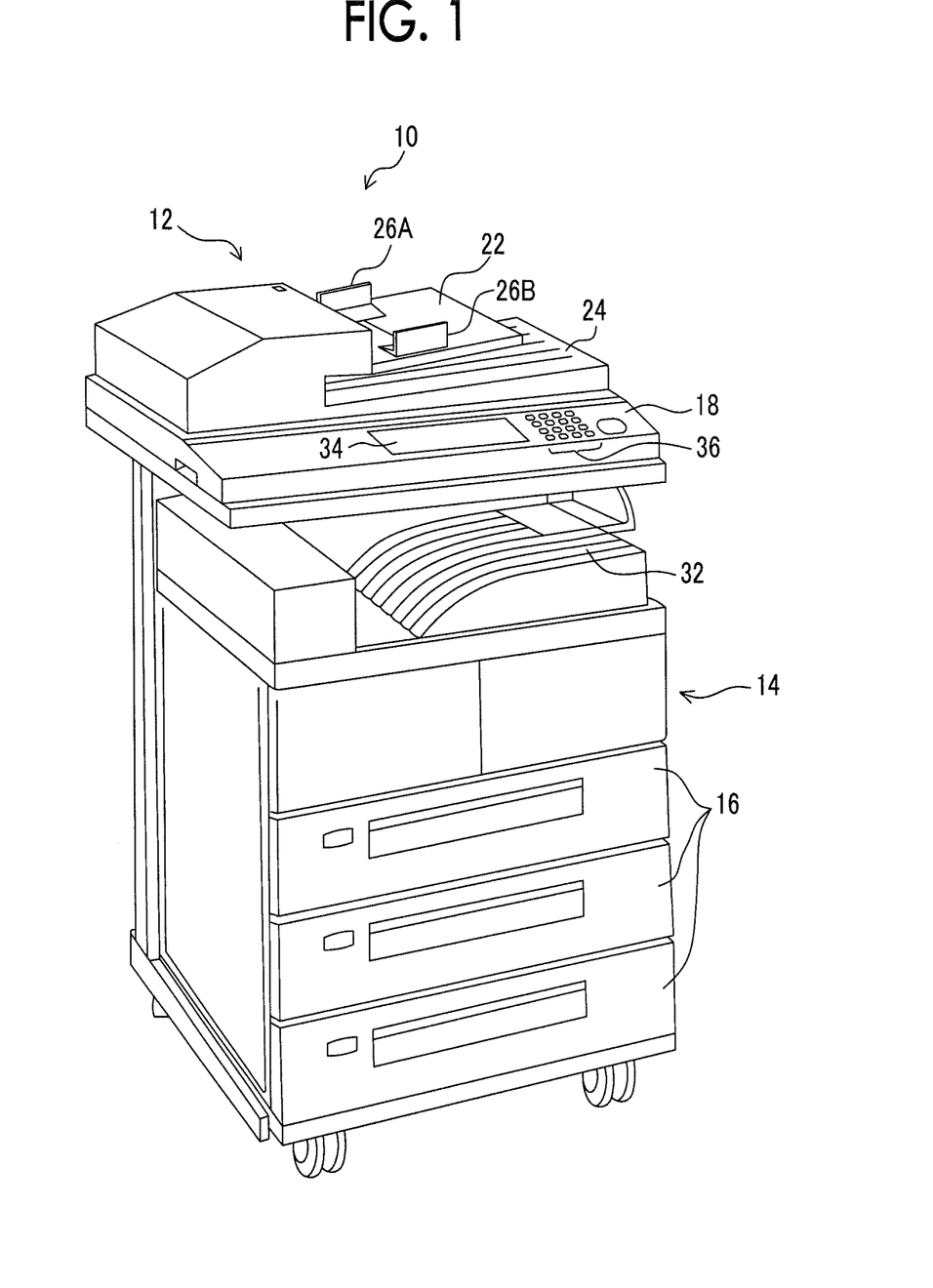
FIG. 1 is a schematic perspective view showing an example of a configuration of an image forming apparatus according to an exemplary embodiment.

FIG. 1 is a perspective view showing an example of a schematic configuration of an image forming apparatus 10 according to the present exemplary embodiment. The image forming apparatus 10 includes a scanner (image reader) 12, an image forming unit 14, a paper feed unit 16, and a user interface (UI) panel 18.

The scanner 12 includes an original document table 22 and a discharge table 24. A pair of guides 26A and 26B is provided on the upper surface of the original document table 22. One guide (guide 26B in the present exemplary embodiment) of the pair of guides 26A and 26B moves in a width direction of the original document P (see FIG. 2) placed on the original document table 22, and guides the original document P when the original document P placed on the original document table 22 is transported. After the scanner 12 takes in the original document P placed on the original document table 22 one by one and reads the taken-in original document P as well as the contour (outline) thereof so as to obtain image information indicating an image of the read original document P, the scanner 12 discharges the original document P to the discharge table 24.

In contrast, the image forming unit 14 takes out a recording sheet which is an example of a recording medium accommodated in the paper feed unit 16, forms (prints) an image based on the image information obtained by the scanner 12 on the taken-out recording sheet, and discharges the recording sheet on which the image is formed to a discharge table 32.

The UI panel 18 includes a touch panel display 34 that displays an image, and switches 36 that is operated for performing various types of setting or the like, various instructions such as a reading of the original document P by the scanner 12 and an image forming on the recording sheet by the image forming unit 14 are input by the user through the touch panel display 34 and the switches 36, and various items of information are displayed on the touch panel display 34.

Figure 2:
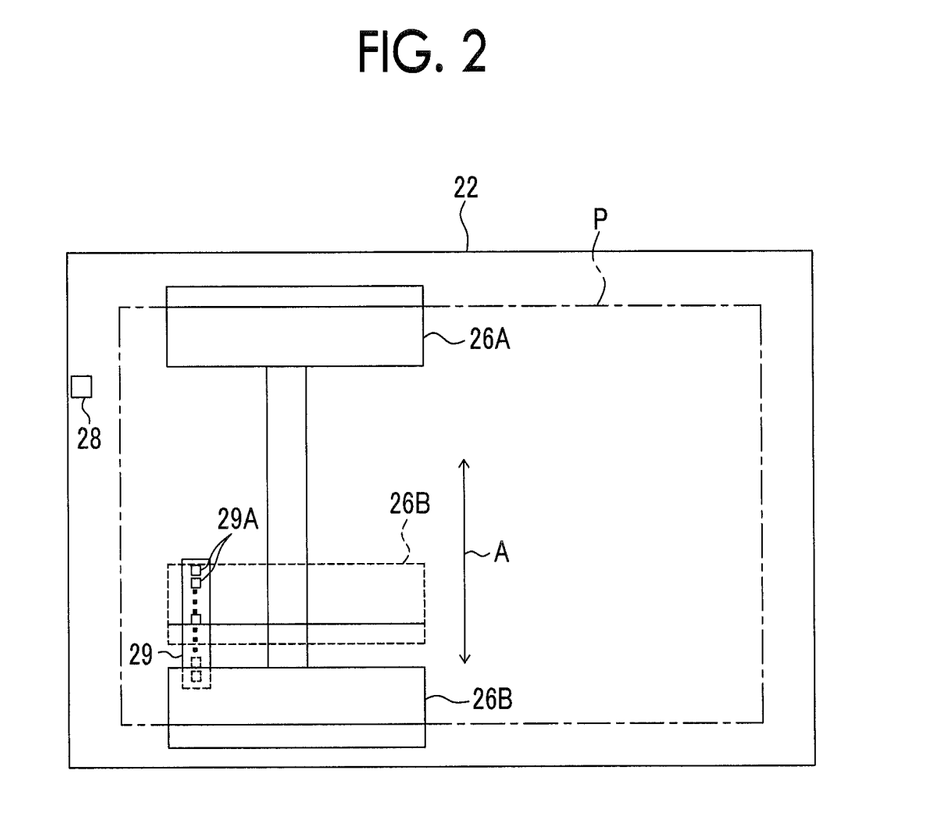
FIG. 2 is a schematic plan view showing an example of a configuration of an original document table of the image forming apparatus according to the exemplary embodiment.

FIG. 2 is a top view of the original document table 22 of the image forming apparatus 10 according to the present exemplary embodiment. As descried above, the guide 26A of the pair of guides 26A and 26B is fixed to the original document table 22, and as shown in FIG. 2 as an example, the guide 26B is provided movably in the original document table 22 in the width direction (the direction orthogonal to the transport direction of the original document P, the direction of an arrow A in FIG. 2) of the original document P placed on the original document table 22. Further, a sensor 28 that senses whether or not the original document P is placed on the original document table 22 is provided in the original document table 22. Furthermore, a sensor 29 that senses the width of the original document P is provided below the guide 26B.

The sensor 29 includes plural photo-reflectors 29A that are arranged at a predetermined interval along the width direction of the original document P. As the guide 26B moves, while the photo-reflectors 29A which are located below the guide 26B are in an ON state, the photo-reflectors 29A which are not located below the guide 26B are in an OFF state. In this manner, as the guide 26B moves according to the width of the original document P placed on the original document table 22, the sensor 29 is switched between the ON state and the OFF state, and thus the sensor 29 may sense the width of the original document P placed on the original document table 22.

Further, in the image forming apparatus 10 according to the present exemplary embodiment, although sensors that sense optically the original document P placed on the original document table 22 using a photo-reflector are used as the sensor and the sensor 29, without being limited to the photo-reflector, a photo-interrupter may be used, a sensor that senses mechanically the original document P using a mechanical switch or the like may be used, and any sensor may be used as long as the sensor contributes to the sensing of the size of the original document P placed on the original document table 22.

Figure 3:
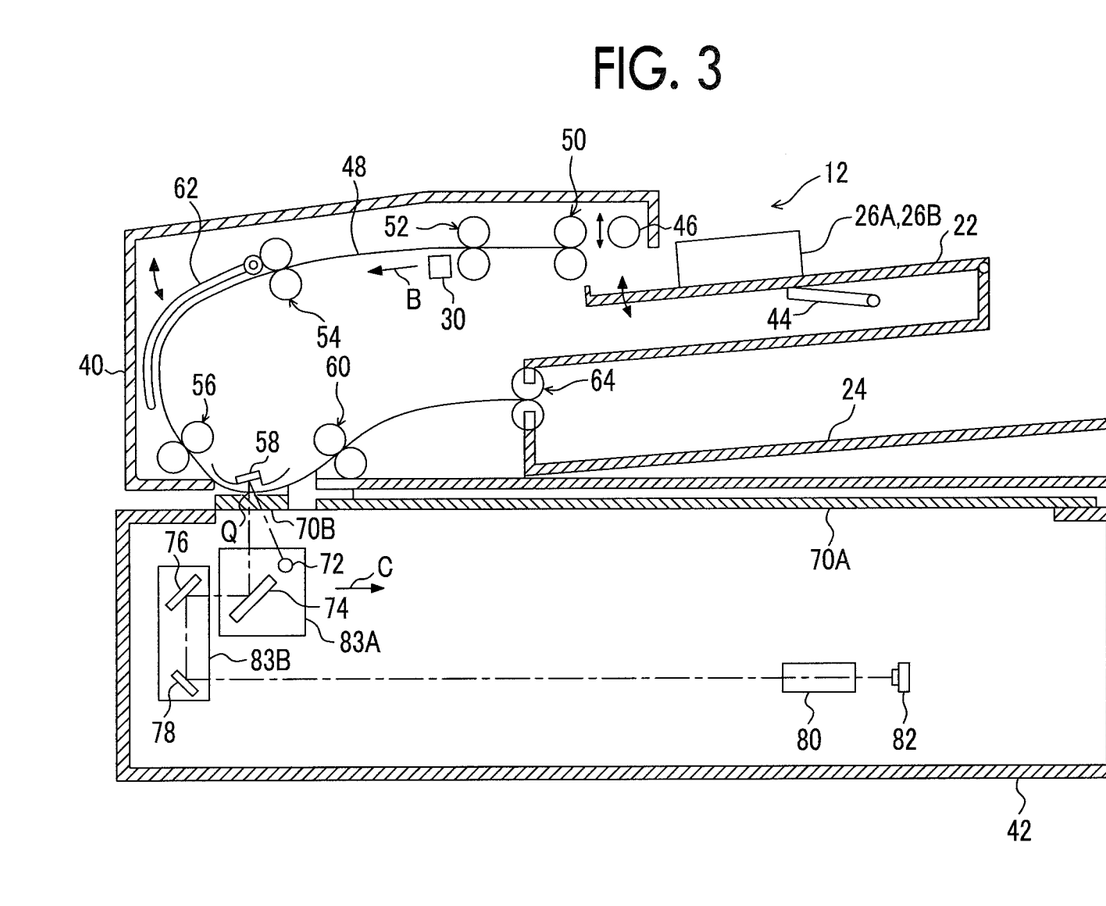
FIG. 3 is a schematic cross-sectional view showing an example of a configuration of a scanner of the image forming apparatus according to the exemplary embodiment.

FIG. 3 is a schematic cross-sectional view showing an example of a configuration of the scanner 12 according to the present exemplary embodiment. As shown in FIG. 3, the scanner 12 is roughly classified into an original document transport unit 40 placed in an upper stage and an image reading unit 42 placed in a lower stage. The original document transport unit 40 is intended to transport the original document P placed on the original document table 22. The image reading unit 42 reads the original document P transported by the original document transport unit 40 as well as the contour thereof, and outputs the image information indicating an image obtained by the reading.

The original document transport unit 40 includes an original document table lifter 44 that lifts the original document table 22 up and down, an original document take-up roller 46 that is in contact with the top surface of the stack of the original documents P on the original document table 22 which is lifted up by the original document table lifter 44 and takes in the original document P one by one, and a feed roller 50 that feeds the original document P taken by the original document take-up roller 46 to a transport path 48.

On the transport path 48 along which the original document P is transported provided are a transport roller 52 that transports the original document P to further downstream of the transport direction (direction of arrow B in FIG. 3), a pre-alignment roller 54 that transports the original document P to further downstream to form a loop, an alignment roller 56 that supplies the original document P while performing a registration adjustment (position adjustment) with respect to the image reading unit 42, a reflecting plate 58 that reflects light emitted from a light source 72, and an out roller 60 that transports the original document P of which image is read to further downstream. In addition, on the transport path 48 provided are a baffle 62 that rotates around the fulcrum depending on a loop state of the original document P to be transported, and a discharge roller 64 that is provided on the further downstream side in the transport direction of the original document P than the out roller 60, and discharges the original document P to the discharge table 24.

Further, the scanner 12 includes a sensor 30 that senses a leading edge and a trailing edge of the original document P between the transport roller 52 and the pre-alignment roller 54. Furthermore, in the present exemplary embodiment, although a sensor that senses the original document P optically using a photo-reflector is used as the sensor 30, without being limited thereto, a photo-interrupter may be used, and other sensors may be used.

Next, a transport operation of the original document P in the scanner 12 according to the present exemplary embodiment will be briefly described.

The original document take-up roller 46 is lifted up and held in a retracted position during a standby time when the original document p is not transported, and is lifted down to a nip position (original document transport position) during transporting the original document so as to transport the original document P on the top of the original document table 22.

The pre-alignment roller 54 causes the leading edge of the original document P to abut onto the alignment roller 56 that is stopped so as to form a loop. When the loop is formed, the baffle 62 is opened around the fulcrum and functions not to disturb the loop of the original document P. In addition, the transport roller 52 and the pre-alignment roller 54 hold the loop during the reading of the image. The reading timing of the original document P is adjusted by the loop formation, and thus the skew (tilt) accompanied by the original document transport during reading the original document P is suppressed so as to increase the adjustability of the alignment. Then, the alignment roller 56 which is stopped starts rotating according to the start timing of the reading of the original document P, and the original document P is transported. The transported original document P is read in the lower surface direction through a transparent second platen glass 70B which will be described later.

In contrast, the image reading unit 42 includes a transparent first platen glass 70A on which the original document P is placed, the transparent second platen glass 70B having a formed opening portion of light for reading the original document P which is being transported by the original document transport unit 40.

Below the first platen glass 70A and the second platen glass 70B provided are the light source 72 that applies illumination light towards the surface of the original document P, a first reflecting mirror 74 that receives the reflected light reflected from the surface of the original document P and bends the traveling direction by 90°, a second reflecting mirror 76 that bends the traveling direction of the reflected light from the first reflecting mirror 74 by 90°, and a third reflecting mirror 78 that bends further the traveling direction of the reflected light from the second reflecting mirror 76 by 90°.

The reflecting plate 58 placed above the second platen glass 70B directly reflects light applied from the light source 72 toward the first reflecting mirror 74. Here, the reading position Q is a position for reading the original document P by irradiating the original document with the light of the light source 72, and is referred to as an area in which the optical path of the reflected light reflected from the reflecting plate 58 and the surface of the second platen glass 70B cross with each other.

In addition, in the image reading unit 42 according to the present exemplary embodiment, although a fluorescent lamp is used as the light source 72, without being limited thereto, other light sources such as plural Light Emitting Diodes (LED) which are arranged along a direction intersecting with the transport direction of the original document P may be used.

Further, the image reading unit 42 includes a lens 80 and an image reading sensor 82. The image reading unit 42 focuses the reflected light reflected by the third reflecting mirror 78 to the image reading sensor 82 using the lens 80 so as to read the original document P as well as the contour thereof using the image reading sensor 82.

In addition, in the image reading unit 42 according to the present exemplary embodiment, although a CCD line sensor configured by plural Charge Coupled Devices (CCD) is used as the image reading sensor 82, without being limited to the CCD line sensor, other solid-state imaging devices such as a Complementary Metal-Oxide Semiconductor (CMOS) image sensor may be used.

Further, in the image reading unit 42 according to the present exemplary embodiment, the light source 72 and the first reflecting mirror 74 are intended to be movable by a carriage 83A, and the second reflecting mirror 76 and the third reflecting mirror 78 are intended to be movable by a carriage 83B, respectively in the direction of arrow C in FIG. 3. Thus, when the original document P is placed on the top surface of the first platen glass 70A, the original document P is read by moving the light source 72, the first reflecting mirror 74, the second reflecting mirror 76, and the third reflecting mirror 78 in the direction of the arrow C while the original document P is irradiated with the illumination light from the light source 72.

Here, a method of detecting the outline (edge) of the original document P in the image forming apparatus 10 according to the present exemplary embodiment will be described.

The edge detection is performed in the reading position Q based on the intensity of the received light when the image reading sensor 82 receives the reflected light of the light which is applied towards the reflecting plate 58 or the original document P from the light source 72.

More specifically, when the reading operation of the image of the original document P is performed, the intensity of the directly reflected light which is reflected by the reflecting plate 58 in a state in which the original document P is not present in the reading position Q and the intensity of the reflected light which is reflected from the original document P which approaches the reading position Q are compared so as to detect the edge of the original document P passing through the reading position Q from the contrast based on the difference between the two intensities of light.

In other words, since the angle of the original document P with respect to the light source 72 is different from the angle of the reflecting plate 58 with respect to the light source 72, when the original document P is irradiated with the light from the light source 72, the light which is diffused and reflected from the original document P is sensed by the image reading sensor 82. Therefore, the intensity of light which is reflected from the original document P and sensed by the image reading sensor 82 is smaller than the intensity of light which is directly reflected from the reflecting plate 58 and sensed by the image reading sensor 82. In the image forming apparatus 10 according to the present exemplary embodiment, the edge of the original document P is detected from the contrast based on the difference between the intensities of light.

In addition, the detected edge is used to extract the edge image in the detection of the skew angle using, for example, a Hough transform which will be described later.

Figure 4:
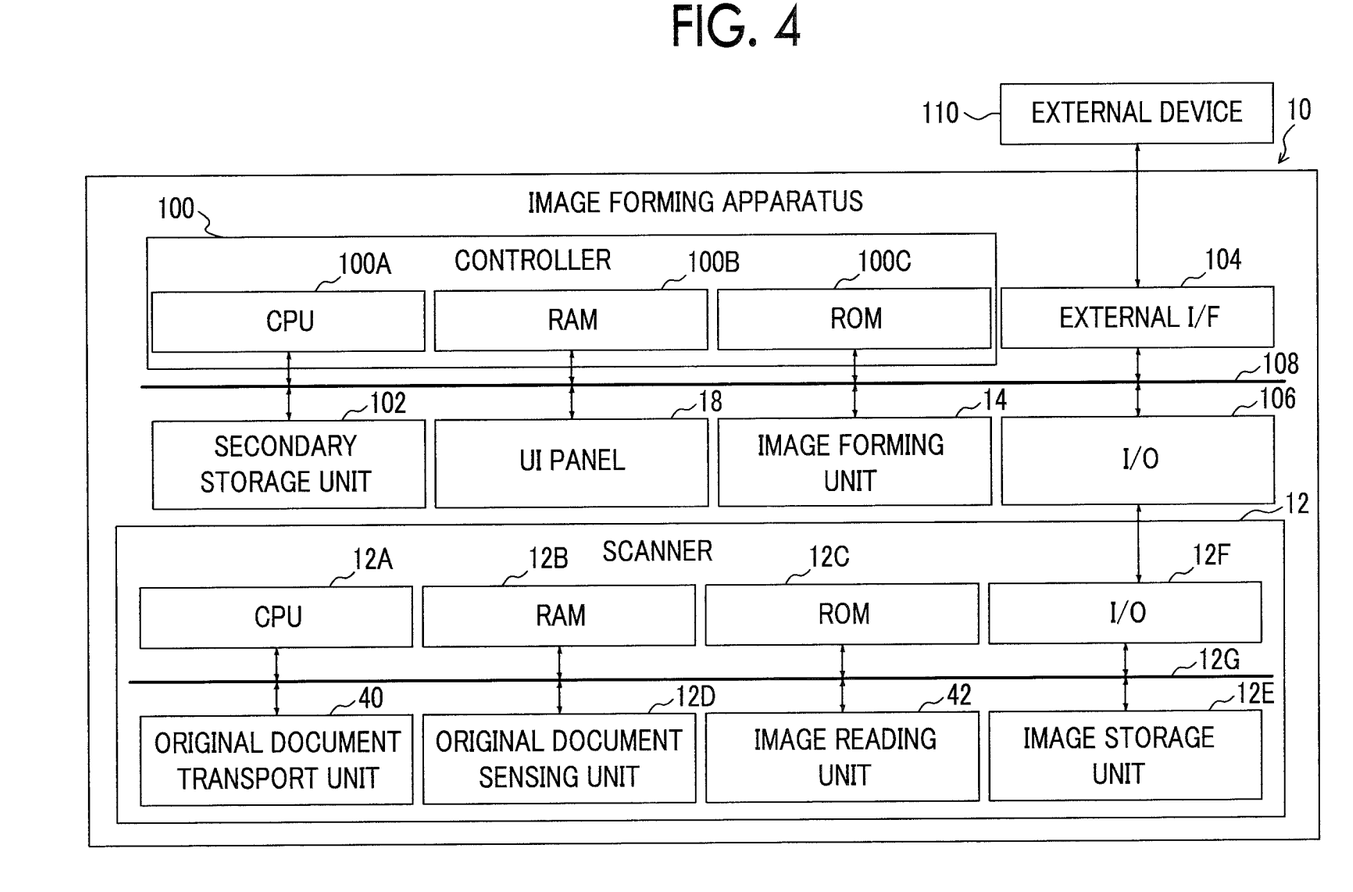
FIG. 4 is a block diagram showing an example of a configuration of main parts of an electric system of the image forming apparatus according to the exemplary embodiment.

FIG. 4 is a block diagram showing an example of a main configuration of an electric system of the image forming apparatus 10 according to the present exemplary embodiment. As shown in FIG. 4, the image forming apparatus 10 is configured to include the image forming unit 14, the UI panel 18, a controller 100, a secondary storage unit 102, an external interface (I/F) 104, and an input and output (I/O) port 106.

The controller 100 is intended to control the overall operation of the image forming apparatus 10, and includes a Central Processing Unit (CPU) 100A, a Random Access Memory (RAM) 100B and a Read Only Memory (ROM) 100C. The RAM 100B is a memory used as a work area or the like during executing various programs. Various programs, various parameters, and various items of table information and the like are stored in advance in the ROM 100C. The CPU 100A loads the program stored in the ROM 100C in the RAM 100B to execute the program which is loaded, and controls the overall operation of the image forming apparatus 10.

The external I/F 104 is connected to an external device 110 such as a personal computer, and the controller 100 and the external device 110 interchange data with each other by using the external I/F 104. The I/O port 106 is connected to the scanner 12, and the controller 100 and the scanner 12 to interchange data with each other by using the I/O port 106.

The CPU 100A, the RAM 100B, the ROM 100C, the secondary storage unit 102, the UI panel 18, the image forming unit 14, the external I/F 104 and the I/O port 106 are connected to each other through a bus 108 such as an address bus, a data bus, and a control bus. Therefore, the CPU 100A respectively performs an access to the RAM 100B, the ROM 100C, and the secondary storage unit 102, an understanding of the operating state of the image forming unit 14, a control of the operation of the image forming unit 14, a displaying of various items of information on the UI panel 18, an understanding of the operation instruction contents of the user with respect to the UI panel 18, an interchange of data with the external device 110 through the external I/F 104, and an interchange of data with the scanner 12 through the I/O port 106.

In contrast, the scanner 12 is configured to include the original document transport unit 40, the image reading unit 42, a CPU 12A, a RAM 12B, a ROM 12C, an original document sensing unit 12D, an image storage unit 12E, and an I/O port 12F. The RAM 12B is a memory used as a work area or the like during executing various programs. Various programs such as a skew correction operation processing program which will be described later, various parameters, and various items of table information and the like are stored in advance in the ROM 12C. The CPU 12A loads the program such as the skew correction operation processing program stored in the ROM 12C in the RAM 12B to execute the program which is loaded, and controls the overall operation of the scanner 12.

The original document sensing unit 12D is configured to include the sensors 28 to 30, and senses the size of the contour of the original document P (for example, the size of the original document P). Specifically, the width of the original document P is sensed by the sensor 29 and the leading edge and trailing edge of the original document P are sensed by the sensors 28 and 30 so as to sense the size of the contour of the original document P.

The image storage unit 12E is a memory that stores image information obtained by the reading in the image reading unit 42. In addition, in the present exemplary embodiment, although a flash memory is adapted to the image storage unit 12E, without being limited thereto, a hard disk device or an EEPROM may be used.

The I/O port 12F is connected to the I/O port 106, and is used for an interchange of data with the controller 100.

The CPU 12A, the RAM 12B, the ROM 12C, the original document sensing unit 12D, the image storage unit 12E, the I/O port 12F, the original document transport unit 40 and the image reading unit 42 are connected with each other through a bus 12G such as an address bus, a data bus, and a control bus. Therefore, the CPU 12A respectively performs an access to the RAM 12B, the ROM 12C, and the image storage unit 12E, an interchange of data with the controller 100 through the I/O port 12F, a control of the operations of the original document transport unit 40, the image reading unit 42 and the original document sensing unit 12D, an understanding of the operating state of the original document transport unit 40, and an understanding of sensing result of the original document sensing unit 12D.

However, when the original document P is tilted during reading the original document P by the image reading unit 42, image information indicating the image of the original document P which remains tilted is stored in the image storage unit 12E and is transmitted as it is when the correction or the like is not performed on the tilt, so that the tilted image is formed on a recording sheet by the image forming unit 14. Accordingly, the image forming apparatus 10 according to the present exemplary embodiment detects the tilt angle (skew angle) of the original document P obtained when it is read by the scanner 12 and corrects the skew angle by performing an image process on the image information of the original document P.

In contrast, in the image forming apparatus 10 according to the present exemplary embodiment, the upper limit value of the angle of the skew that may occur in the original document transport unit 40 is assumed on a design of the original document transport unit 40 of the scanner 12. The specific value of the upper limit value is a value of approximately 1.3° or so as an example.

A method of detecting the skew angle is roughly classified into a mechanical method of performing a detection using a sensor or the like and a method using an image process of detecting by an arithmetic process based on the image information of the original document P which is read by the image reading unit 42, but the present exemplary embodiment adopts an aspect by the method using an image process.

The method of detecting a skew angle using an image process detects the outline (here, indicates a boundary portion between the image information of a background and the image information of the original document P. Hereinafter, referred to as "edge") of the image information of the original document P which is read by the image reading unit 42, and obtains an angle between the edge and a predetermined reference line, which is regarded as a skew angle. Here, the reference line corresponds to the direction orthogonal to the transport direction of the original document P in the original document transport unit 40, that is, the direction of the side of the original document P in the direction orthogonal to the transport direction when there is no skew.

Here, a Hough transform process which is one of the methods of detecting a skew angle using an image process will be described. In the present exemplary embodiment, although it is assumed that the Hough transform process is performed by the CPU 12A, it may be performed, for example, by a dedicated image processing unit (not shown) connected to the CPU 12A through the bus 12G.

First, in the image forming apparatus 10 according to the present exemplary embodiment, with respect to the image information of the original document P as well as the edge thereof which is read by the image reading unit 42, a gradation value (pixel value) of each pixel is binarized, as a pre-process of the Hough transform process. In addition, in the following description, each edge of the original document P is distinguished into an edge (side) of the original document P to be read first by the image reading sensor 82 which is referred to as a "leading edge" and an edge (side) orthogonal to the "leading edge" which is referred to as "side edge".

When the position of a pixel in image information in which a gradation value is represented by a binary value is represented in an X-Y orthogonal coordinate system that represents the position of a pixel as an X coordinate and Y coordinate, when a distance from a point of origin to a straight line is R (here, the straight line passes through the coordinate (x, y), and an angle between an X-axis and an orthogonal line which is drawn from the point of origin to the straight line is θ), all straight lines passing through the pixel located at the coordinate (x, y) in the X-Y coordinate are represented as the following Expression (1).

$$R = x \cos\theta + y \sin\theta \quad (0 \le \theta < \pi) \quad (1)$$

Figure 5A:
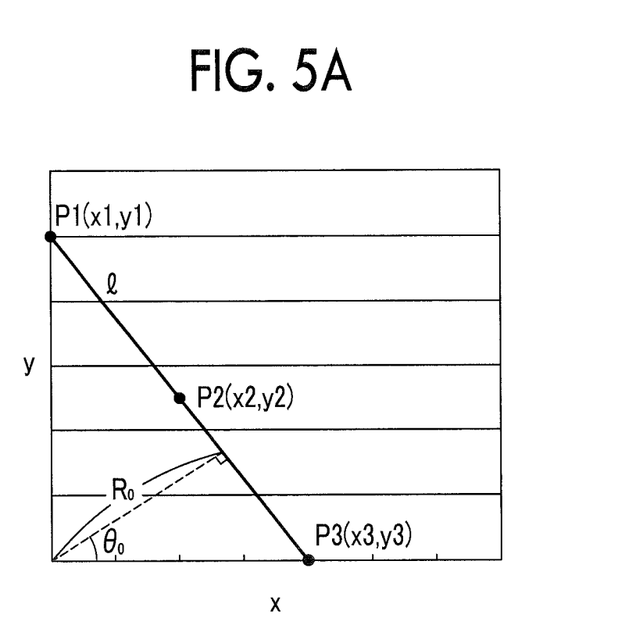
FIGS. 5A and 5B are graphs for providing an explanation of a Hough transform process.
Figure 5B:
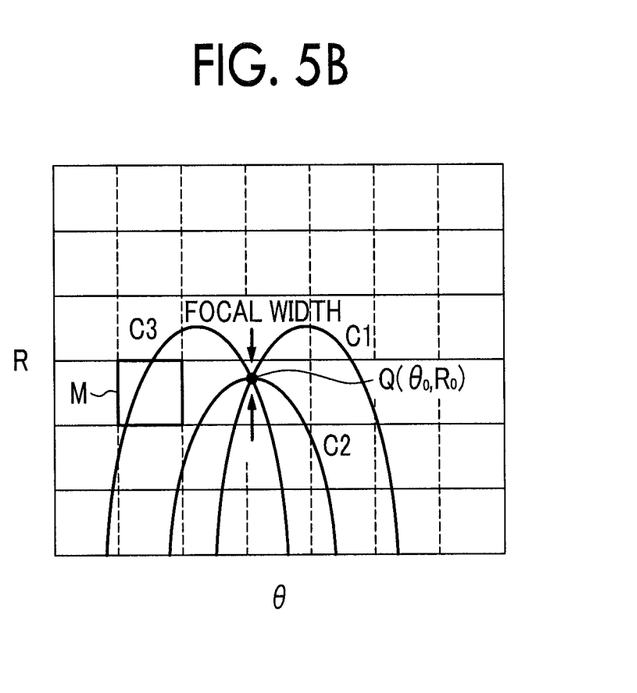

For example, when the θ is sequentially changed from 0 to π in the Expression (1) with respect to the pixels located at coordinates P1 (x1, y1), P2 (x2, y2), and P3 (x3, y3) on the straight line 1 shown in FIG. 5A, and R obtained depending on the change in the θ is plotted in a θ-R coordinate as shown in FIG. 5B, all straight lines passing through a certain pixel are represented by curves in the θ-R coordinate. The curves are called Hough curves: the Hough curve corresponding to the coordinate P1 is called the Hough curve C1, the Hough curve corresponding to the coordinate P2 is called the Hough curve C2, and the Hough curve corresponding to the coordinate P3 is called the Hough curve C3. The process of obtaining Hough curves in this way is referred to as a Hough transform process.

As shown in FIG. 5B, the Hough curves C1, C2, and C3 are uniquely specified depending on the positions and tilts of the straight line 1, respectively. Further, although an intersection Q (R0, θ0) of the Hough curves C1, C2, and C3 is present, when the value of R0 and θ0 on the intersection Q is referred, the straight line 1 is uniquely specified from the values. In other words, as long as a point is located on the straight line 1, even when a Hough curve is represented based on the pixel located at a certain coordinate, the Hough curve passes through the intersection Q (R0, θ0).

In the detection of a skew angle using a Hough transform, a predetermined number of points on the edge (corresponding to P1, P2 and P3 in FIG. 5A. Hereinafter, the pixels on the selected edge are referred to as "edge pixel") of the image of the original document P read by the image reading unit 42 are selected on a pixel-by-pixel basis, and the edge pixels are subjected to the Hough transform so as to estimate the edge (outline) of the original document P using the properties of the Hough transform. In other words, when the edge pixels arranged on the edge are subjected to the Hough transform, the edge pixels are focused to one point in principal as described above, so that the point (corresponding to an intersection Q in FIG. 5B. Hereinafter, referred to as a "focal point"), at which curves corresponding to the edge pixels which are subjected to the Hough transform cross, is estimated as the point corresponding to the edge (corresponding to the straight line 1 in FIG. 5A).

Here, in many cases, in fact, an edge is not a single straight line, but is bent or jagged, so that the edge pixels are not necessarily located on a single straight line. In this case, the intersection point of Hough curves obtained by performing a Hough transform on the edge pixels have a fixed width in an R-axis direction. Although one point is needed to be specified on the θ-R coordinate when the edge is obtained, in fact, on a graph in which plural Hough curves are drawn, θ corresponding to a part having the narrowest width in the R-axis direction is estimated as a skew angle θ corresponding to an actual skew angle (an angle between the reference line and the leading edge) θs*. Hereinafter, the width of the part having the narrowest width in the R-axis direction in the graph in which plural Hough curves are drawn in an overlap manner is referred to as a "focal width" (see FIG. 5B). The focal width is one of the evaluation indexes of the result of the Hough transform process when a skew angle is obtained.

Figure 6A:
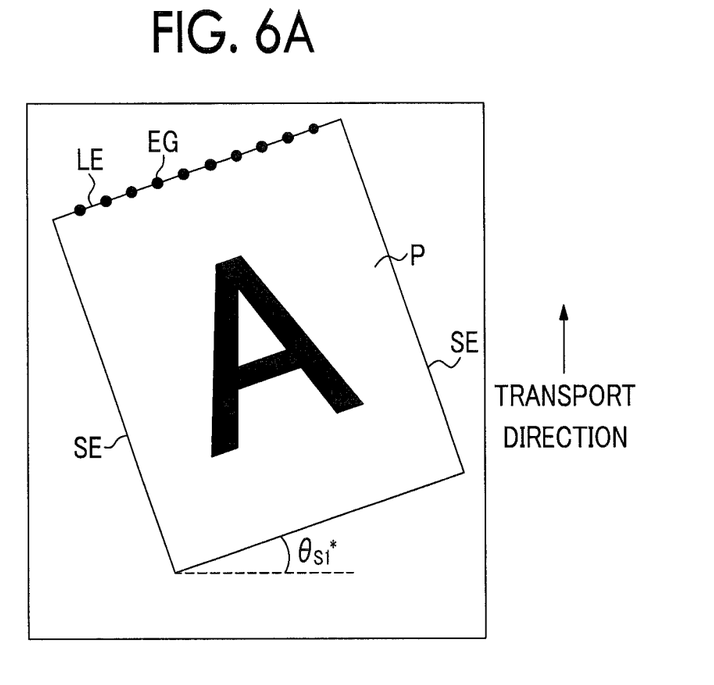
FIGS. 6A and 6B are diagrams for explaining a relationship between an original document which is skewed and a Hough transform of the original document.

A relationship between the original document P which is skewed and the Hough transform thereof will be described with reference to FIGS. 6A and 6B. FIG. 6A shows a state in which the original document P is skewed by the skew angle θs1*. Each point denoted by EG in FIG. 6A indicates the edge pixel, and FIG. 6A shows that ten edge pixels on the leading edge (LE) are selected. In addition, SE in FIG. 6A denotes a side edge.

Figure 6B:
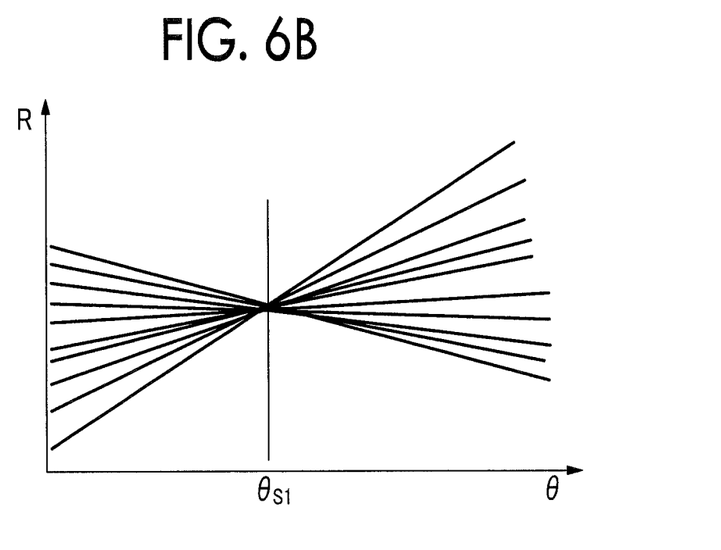

FIG. 6B shows Hough curves obtained by Hough transform based on the edge pixels EG of the original document P which is skewed by the skew angle θs1*. In addition, FIG. 6B shows a state in which a predetermined range in the vicinity of the focal point of all Hough curves obtained by the Hough transform is enlarged.

As shown in FIG. 6B, the respective edge pixels EG are respectively transformed into Hough curves to form a curve group, so that the value θs1 of θ corresponding to the part having the narrowest width in the R-axis direction is estimated as a skew angle with reference to FIG. 6B.

Here, the original document P which is read by the user using the image reading unit 42 have actually many types such amorphous types, types having irregularities in the outer shape (outline), types having a tab or a label, or types having folded corner. In the skew angle detection method of the related art, an erroneous detection occurs in this case, and the detected skew angle is remarkably different from the skew angle to be corrected. As a result, there is a concern in which the erroneous correction of a skew occurs.

Figure 7A:
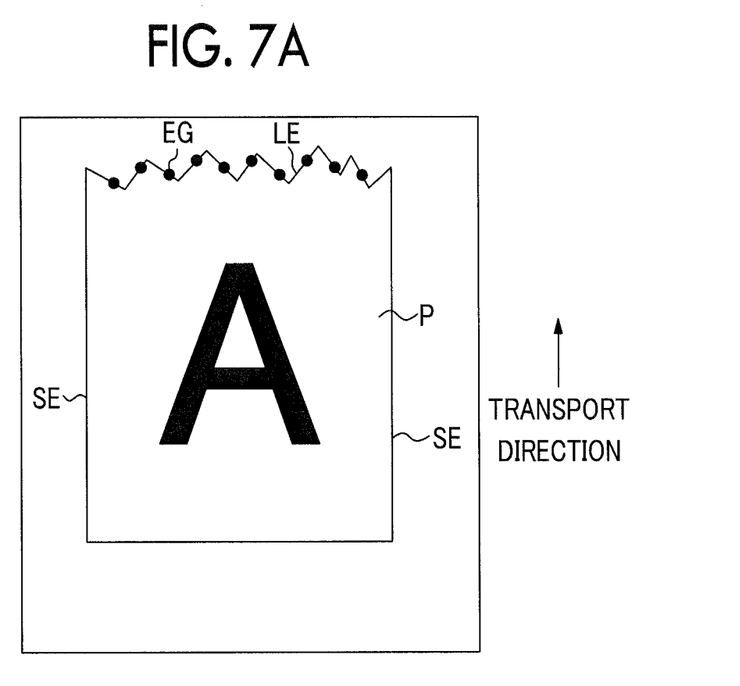
FIGS. 7A and 7B are diagrams for explaining a relationship between an original document having a special shape and the Hough transform of the original document.

The erroneous correction of a skew will be described with reference to FIGS. 7A and 7B. FIG. 7A shows an example in which the leading edge LE of the original document P is jagged, but the skew does not occur (when θs*=0). Since the leading edge LE is jagged, even when the edge pixels EG are selected at the same sample density as in the example shown in FIGS. 6A and 6B, these edge pixels EG are not located on a single straight line.

Figure 7B:
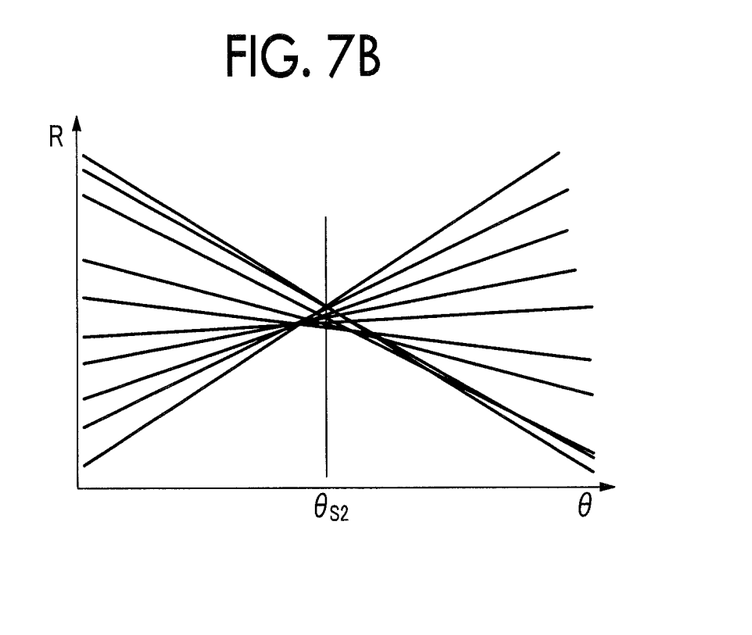

FIG. 7B is a diagram showing Hough curves obtained by the Hough transform based on the edge pixels EG of FIG. 7A, and similar to FIG. 6B, the value θs2 of θ of the part (focal point) having the narrowest width in the R-axis direction is read, and the θs2 is estimated as a skew angle. In this case, since the edge pixels EG are not located on the straight line, in some cases, θs2≠0. In this case, when the θs2 is estimated as the skew angle and the skew correction operation is performed, despite the skew does not occur in fact, the correction is performed to tilt the image shown by the image information of the original document P which is not tilted.

The image forming apparatus 10 according to the present exemplary embodiment is intended to reduce the erroneous correction of the skew. Specifically, in the image forming apparatus 10 according to the present exemplary embodiment, the skew angle is detected and the information indicating the reliability of the detected angle (hereinafter, in some cases, referred to as "degree of reliability") is generated. When the degree of reliability is a predetermined threshold or more, the skew correction operation process is performed, and when the degree of reliability is smaller than a predetermined threshold, the skew correction operation process is not performed.

As describe above, the focal width in the Hough transform is considered to be one of evaluation indexes of the degree of reliability. In other words, as the focal width is narrow, a straight line group represented by plural Hough curves is approximate to a single straight line, so that it is considered that the detection of the skew angle is performed accurately and it may be said that the degree of reliability of the focal width is high. On the contrary, as the focal width is wide, the straight line group is focused towards a single straight line, but it is considered that the accuracy of the detection of the skew angle falls and the degree of reliability of the focal width is said to be low.

However, "the percentage of votes" other than the focal width is also considered as an evaluation index of the result of the Hough transform process. As shown in FIG. 5B, the θ-R plane is divided by a constant width into a mesh (reticulation) shape (hereinafter, the each divided "reticulation" is referred to as a "cell". The symbol M in FIG. 5B indicates one of the cells. In FIG. 5B, the plane is divided into 7×6 cells, but of course, the plane is divided more finely in fact to improve the accuracy). When one Hough curve passes through a cell, the cell is counted to obtain one vote and the votes are aggregated at each cell with respect to the all Hough curves.

Specifically, for example, in FIG. 5B, since the Hough curve C3 passes through the cell M, the cell M obtains one vote. Then, the percentage of votes is an evaluation index that is defined as a ratio of votes of a certain cell (the maximum number of votes of each cell) to the number of all Hough curves. According to the percentage of votes, a degree of contribution ratio, at which Hough curves are concentrated in a cell on the θ-R plane to which Hough curves are concentrated, with respect to all Hough curves is evaluated. Therefore, as the cell has a high percentage of votes, a straight line group which is represented by plural Hough curves is approximate to a single straight line, so that it is considered that the detection of the skew angle is performed accurately and it may be said that the degree of reliability of the percentage of votes is high. On the contrary, as the percentage of votes is small, Hough curves are relatively focused on one cell, but it is considered that the accuracy of the detection of the skew angle falls, and it may be said that the degree of reliability of the percentage of votes of the cell is low.

Furthermore, in the present exemplary embodiment, the upper limit value of the skew angle which is assumed in the above described scanner 12 is adopted as an evaluation index of a skew. In other words, for example, the skew angle, which is considered to be unavailable on design of the scanner 12, is corrected within the range of the upper limit value.

Figure 8:
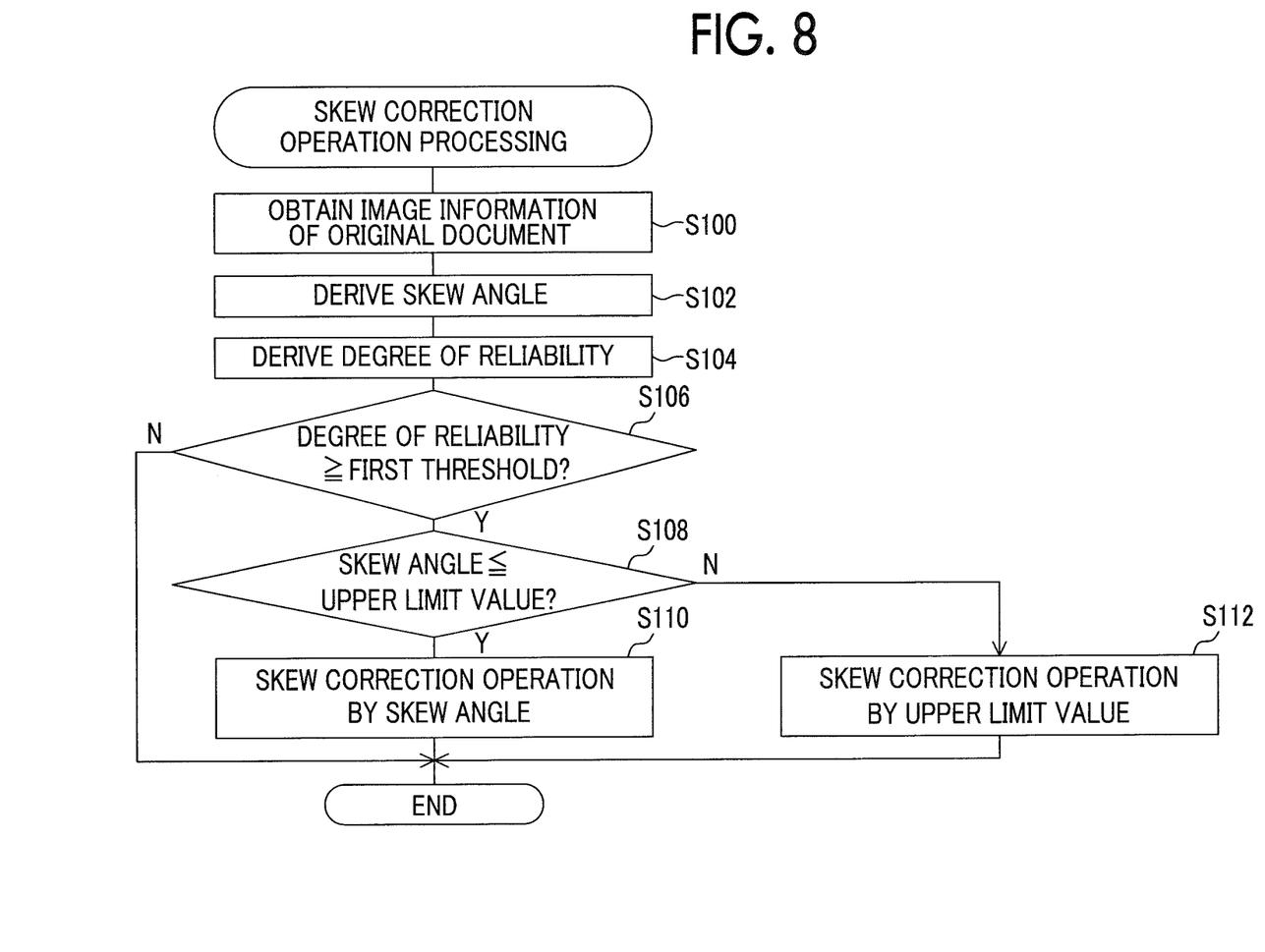
FIG. 8 is a flowchart showing a flow of a process of a skew correction operation processing program according to a first exemplary embodiment.

Hereinafter, a skew correction operation process performed by the image forming apparatus 10 will be described with reference to FIG. 8. FIG. 8 is a flowchart showing a process of a skew correction operation processing program according to the present exemplary embodiment.

In the process shown in FIG. 8, when the user sets the original document P in the original document table 22 of the scanner 12 and instructs to start reading through the UI panel 18 or the like, the skew correction operation processing program which is stored in the ROM 12C is read by the CPU 12A, and the skew correction operation processing program is executed by the CPU 12A.

In addition, in the present exemplary embodiment, although an aspect is described in which the present skew correction operation processing program is stored in advance in the ROM 12C, without being limited thereto, an aspect in which the present skew correction operation processing program is stored in a storage medium readable by a computer, an aspect in which the present skew correction operation processing program is distributed through a communication unit in a wire or wireless manner, or the like may be employed.

In addition, in the present exemplary embodiment, the skew correction operation process is realized by a software configuration by executing a program using a computer, but is not limited thereto. For example, it may be realized as a hardware configuration adopting Application Specific Integrated Circuit (ASIC) or as a combination of a software configuration and a hardware configuration.

As shown in FIG. 8, first, in step S100, the original document P is read by the image reading sensor 82 of the image reading unit 42 to obtain the image information of the original document P.

In the next step S102, the skew angle is derived (detected).

In addition, in the present exemplary embodiment, although an aspect adopting a Hough transform as a detection method of a skew angle is described as an example, without being limited thereto, other detection methods such as a least-square method may be adopted. For example, an error function is considered as the evaluation index of the degree of reliability when the least-square method is used.

In the next step S104, the degree of reliability of the skew angle derived in step S102 is derived.

In the next step S106, it is determined whether the degree of reliability obtained in step S104 is a first predetermined threshold (an inverse of the focal width or a threshold of the percentage of votes) or more.

For example, the inverse of the focal width in the Hough transform described above or the percentage of votes is used as the degree of reliability.

Here, with respect to the specific value of the inverse of the focal width or the threshold of the percentage of votes, a case where the leading edge LE is the short side of the original document of A4 size and the resolution is 600 dots per inch (dpi) when the original document P is read by the image reading sensor 82 is described as an example.

In this case, since the length of the leading edge LE is 210 mm, the number of pixels of the edge when the resolution is 600 dpi is 600×210/25.4≈4,960 pieces.

With respect to the number of pixels of the edge in the case of detecting the skew angle, in some cases, the resolution is reduced to approximately a fraction or so from a viewpoint such as an operation speed by a CPU and a memory capacity. The resolution is reduced to 150 dpi even in the image forming apparatus 10 according to the present exemplary embodiment, so that the number of edge pixels becomes 4,960/4=1,240 pieces and the value becomes a population parameter in the case of setting the threshold for the degree of reliability. In other words, the number of Hough curves drawn on the θ-R plane reaches a total of 1,240 lines.

Thus, for example, the threshold when the degree of reliability is the inverse of the focal width may be, for example, the inverse of the total number of Hough curves which are distinguishable as lines when viewed in the R-axis direction on the θ-R plane, among the Hough curves of 1,240 lines.

In other words, when it is regarded that Hough curves of two or more overlapping at the focal point are counted as one, in theory, the total number of the Hough curves is a value from one of the highest degree of reliability in which all Hough curves overlap, up to 1,240 of the lowest degree of reliability in which all Hough curves deviate. Accordingly, a threshold may be set to the inverse of the total number of the Hough curves so as to determine the degree of reliability.

The threshold of the inverse of the focal width may be the inverse of the total number of the Hough curves at the focal point obtained by performing a Hough transform on the original document P as a standard using a simulation, or the like, or a value obtained by giving a margin to the inverse of the total number of the Hough curves, for example, 0.1 for the total number of ten Hough curves.

In addition, the threshold when the degree of reliability is the percentage of votes also may be the percentage of votes at the focal point obtained by performing a Hough transform on the original document P as a standard using a simulation, or the like, or a value obtained by giving a margin to the percentage of votes, for example, the percentage of votes of 50% among the 1,240 lines.

Referring to FIG. 8 again, while the process proceeds to step S108 when an affirmative determination is made in step S106, the present skew correction operation processing program is ended when a negative determination is made. In other words, since it is determined that the derived skew angle lacks reliability, the skew correction operation process is not performed.

In step S108, it is determined whether the skew angle derived in step S102 is less than the upper limit value of the skew angle that is assumed in the scanner 12.

Here, the upper limit value of the skew angle is the upper limit value of the skew that may occur in the original document transport unit 40 as described above, and for example, 1.3° described above may be used.

When an affirmative determination is made in step S108, the process proceeds to the next step S110 to perform the skew correction operation process using the skew angle derived in step S102.

In contrast, when a negative determination is made in step S108, the process proceeds to step S112 to correct the skew to the upper limit value of the skew angle. In other words, since the derived skew angle is improbable in principle on design of the scanner 12, the angle to be corrected is fixed to the upper limit value in anticipation of safety.

The image shown by the image information of the original document P read by the image reading unit 42 is subjected to a rotation process based on the derived skew angle so as to perform the skew correction operation. The rotation process may be performed, for example, using a transform such as an affine transform.

In addition, in the present exemplary embodiment, although in step S108, it is described as an example, an aspect in which the evaluation of the skew angle is performed by the upper limit value of the skew angle that is assumed in the scanner 12, without being limited thereto, it is possible to determine whether or not to execute the skew correction operation based on only the degree of reliability of the skew angle by Hough transform with omitting steps S108 to S112.

Further, although an aspect in which the skew angle is corrected to the upper limit value of the skew angle in step S112 is described as an example, without being limited thereto, for example, the skew may be corrected to an angle of half the upper limit value of the skew angle in anticipation of safety, or the skew correction operation may not be performed.

As described above, according to the image forming apparatus according to the present exemplary embodiment, the erroneous correction of the tilt angle of the original document is reduced.

(Second Exemplary Embodiment)

The image forming apparatus 10 according to the present exemplary embodiment will be described with reference to FIG. 9. The present exemplary embodiment has an aspect obtained by further adding an evaluation index indicating a degree of reliability of a skew angle to the first exemplary embodiment.

The size itself of the original document P is considered as an evaluation index of the degree of reliability of the skew angle obtained by reading the original document P. In other words, when the size of the original document P is smaller than the minimum size of the original document that is assumed in the scanner 12 of the image forming apparatus 10 (which is guaranteed in the scanner 12), how it works (rotates) in the image reading unit 42 is not predictable. Further, it is predicted that the number of edge pixels is extremely small even when the image reading unit 42 performs reading at the same resolution and the accuracy of the Hough transform process itself also falls, and as a result, it is considered that the probability of occurrence of the erroneous correction of the skew increases.

Therefore, the size of the original document P, as an example in the present exemplary embodiment, the length of the leading edge is assumed as an evaluation index, and when the evaluation index is greater than a predetermined threshold, the skew correction operation is performed so as to reduce the erroneous correction of the skew.

With respect to the evaluation index of the size of the original document P, the size is detected by the sensor 29 described above (or the size is not detected by the sensor 29) and for example, the length of the edge that is guaranteed by the scanner 12 described above is employed as the threshold of the length of the leading edge, specifically, may be, for example, approximately 30 mm or so.

Further, the ratio of the number of edge pixels to the size of the original document P (for example, the length of the leading edge) is contemplated as a separate evaluation index of the degree of reliability of the skew angle obtained by reading the original document P. In other words, as the ratio to the length of the leading edge is small even with the same number of edge pixels, the accuracy of a Hough transform itself falls, and as a result, the probability of occurrence of the erroneous correction increases. Thus, for example, an evaluation index is assumed in which the edge index=the number of edge pixels/the length of the leading edge (pieces/cm), and when the evaluation index is greater than a predetermined threshold, the skew correction operation is performed so as to reduce the erroneous correction of the skew.

Here, the "length of the leading edge" is, for example, a vertical or horizontal length (since the reading is performed by the image reading unit 42, it depends on the direction of the original document P which is set in the original document table 22) of the original document P. As an example, when the size of the original document P is A4, the length of each edge (side) in A4 size is 297 mm×210 mm, and thus the length of the leading edge is 297 mm or 210 mm. In this case, the specific value of the threshold of the edge index may be set to, for example, a lower limit value of the edge index. The lower limit value of the edge index, at which the accuracy of a Hough transform is maintained, is obtained based on an experiment or simulation, and is for example, 50 (pieces/cm) or so.

Next, the skew correction operation process performed by the image forming apparatus 10 according to the present exemplary embodiment will be described with reference to FIG. 9. FIG. 9 is a flowchart showing a flow of the process of the skew correction operation processing program according to the present exemplary embodiment.

Figure 9:
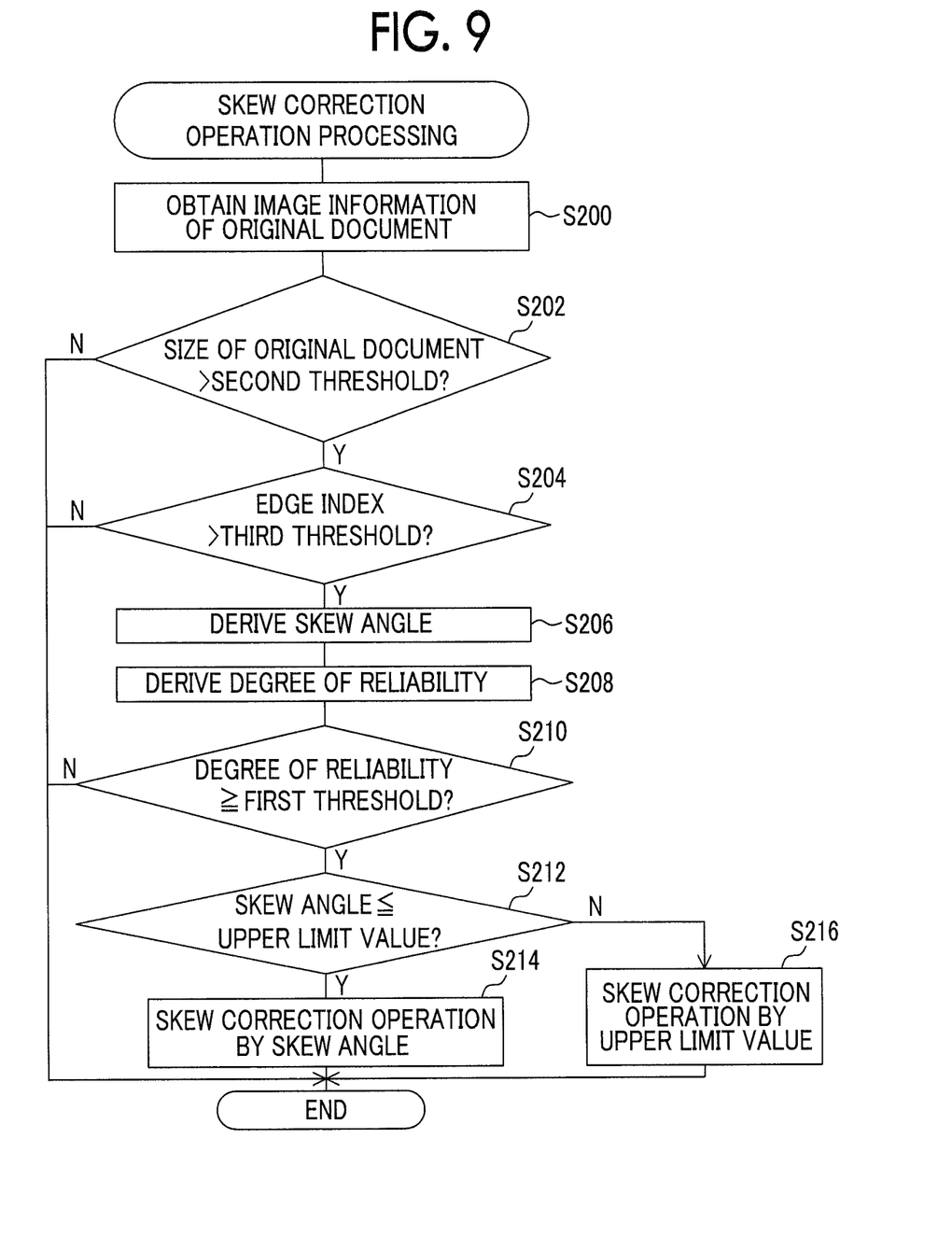
FIG. 9 is a flowchart showing a flow of a process of a skew correction operation processing program according to a second exemplary embodiment.

Even in the process shown in FIG. 9, similar to FIG. 8, it is assumed that the user sets in advance the original document P in the original document table 22 of the scanner 12 and instructs to start a reading through the UI panel 18 or the like.

First, in step S200, the original document P is read by the image reading unit 42 to obtain the image information of the original document P.

In the next step S202, it is determined whether or not the size of the original document P is greater than a second threshold (a threshold of the length of the leading edge). While the process proceeds to the next step S204 when an affirmative determination is made in step S202, the present skew correction operation processing program is ended when a negative determination is made.

In step S204, it is determined whether or not the edge index is greater than a third threshold (a threshold of the edge index), while the process proceeds to step S206 when an affirmative determination is made as a result, the skew correction operation processing program is ended when a negative determination is made.

Since steps S206 to S216 are similar to steps S102 to S112 in FIG. 8, the description thereof is omitted.

As apparent from the above description, the erroneous correction of the tilt angle of the original document is reduced according to the image forming apparatus according to the present exemplary embodiment.

In the present exemplary embodiment, the evaluation index of the degree of reliability of the detected skew angle is added to the first exemplary embodiment, so that the erroneous correction of the tilt angle of the original document is reduced more effectively.

Here, in the above exemplary embodiment, although when the percentage of votes is regarded as the degree of reliability, the percentages of votes of respective cells are compared and determined, without being limited thereto, plural cells are bound to be regarded as a merged cell, and respective merged cells may be compared and determined. In this case, for example, the total value or the average value of the value of votes of each cell within the merged cell is employed as the value of the merged cell, and a threshold corresponding to the total value or the average value may be set.

In addition, the flow (see FIGS. 8 and 9) of the process of the skew correction operation processing program described in each exemplary embodiment described above is an example, without departing from the scope and spirit of the present invention, the unnecessary steps may be deleted, and new steps may be added or the processing order may be interchanged.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tilt angle correction apparatus comprising:
    a deriving unit that based on pixel values of a plurality of pixels corresponding to a predetermined side of an original document of image information obtained by reading the original document, derives a tilt angle of the side relative to a predetermined reference and derives a degree of reliability of the derived tilt angle; and
    a correction unit that corrects a direction of an image shown by the image information, based on the derived tilt angle when the degree of reliability is over a predetermined threshold, and does not correct the direction of an image shown by the image information, based on the derived tilt angle when the degree of reliability is under the predetermined threshold;
    wherein the correction unit corrects the direction of the image using the derived tilt angle when the derived tilt angle is an upper limit value or less that is assumed during transporting the original document, and corrects the direction of the image using an angle that is the upper limit value or less as the derived tilt angle when the derived tilt angle is over the upper limit value.

2. The tilt angle correction apparatus according to claim 1, wherein the correction unit performs the correction when the size of the original document is greater than a predetermined threshold.

3. The tilt angle correction apparatus according to claim 2, wherein the correction unit performs the correction when the number of pixels per unit length of the side of the original document or the number of pixels per unit area of the original document is over a predetermined threshold.

4. The tilt angle correction apparatus according to claim 3, wherein the deriving unit derives the tilt angle based on at least one of a focal width and a percentage of votes which are obtained from a result of performing a Hough transform on each of the plurality of pixels, and derives at least one of an inverse of the focal width and the percentage of votes as the degree of reliability.

5. The tilt angle correction apparatus according to claim 2, wherein the deriving unit derives the tilt angle based on at least one of a focal width and a percentage of votes which are obtained from a result of performing a Hough transform on each of the plurality of pixels, and derives at least one of an inverse of the focal width and the percentage of votes as the degree of reliability.

6. The tilt angle correction apparatus according to claim 1, wherein the correction unit performs the correction when the number of pixels per unit length of the side of the original document or the number of pixels per unit area of the original document is over a predetermined threshold.

7. The tilt angle correction apparatus according to claim 6, wherein the deriving unit derives the tilt angle based on at least one of a focal width and a percentage of votes which are obtained from a result of performing a Hough transform on each of the plurality of pixels, and derives at least one of an inverse of the focal width and the percentage of votes as the degree of reliability.

8. The tilt angle correction apparatus according to claim 1, wherein the deriving unit derives the tilt angle based on at least one of a focal width and a percentage of votes which are obtained from a result of performing a Hough transform on each of the plurality of pixels, and derives at least one of an inverse of the focal width and the percentage of votes as the degree of reliability.

9. An image reader comprising:
the tilt angle correction apparatus according to claim 1; and
an output unit that outputs image information after the image information is subjected to a processing by the correction unit.

10. An image forming apparatus comprising:
the tilt angle correction apparatus according to claim 1.

11. An image forming apparatus comprising:
the image reader according to claim 9; and
a forming unit that forms an image on a recording medium based on the image information which is output from the output unit.

12. A non-transitory computer readable medium storing a program causing a computer to execute as:
a deriving unit that based on pixel values of a plurality of pixels corresponding to a predetermined side of an original document of image information obtained by reading the original document, derives a tilt angle of the side relative to a predetermined reference and derives a degree of reliability of the derived tilt angle; and
a correction unit that corrects a direction of an image shown by the image information, based on the derived tilt angle when the degree of reliability is over a predetermined threshold, and does not correct the direction of an image shown by the image information, based on the derived tilt angle when the degree of reliability is under the predetermined threshold;
wherein the correction unit corrects the direction of the image using the derived tilt angle when the derived tilt angle is an upper limit value or less that is assumed during transporting the original document, and corrects the direction of the image using an angle that is the upper limit value or less as the derived tilt angle when the derived tilt angle is over the upper limit value.

* * * * *